(12) United States Patent
Chason et al.

(10) Patent No.: US 10,941,051 B2
(45) Date of Patent: Mar. 9, 2021

(54) LIQUID FILTER APPARATUS AND SYSTEM

(71) Applicants: Marc Kenneth Chason, Schaumburg, IL (US); Rick Latella, Woodstock, IL (US); Dan Gamota, San Jose, CA (US); J Richard Schorr, Westerville, OH (US); Suvankar Sengupta, Hilliard, OH (US); Ramachandra Revur, Hillard, OH (US); Timothy A. Marth, New Albany, OH (US)

(72) Inventors: Marc Kenneth Chason, Schaumburg, IL (US); Rick Latella, Woodstock, IL (US); Dan Gamota, San Jose, CA (US); J Richard Schorr, Westerville, OH (US); Suvankar Sengupta, Hilliard, OH (US); Ramachandra Revur, Hillard, OH (US); Timothy A. Marth, New Albany, OH (US)

( * ) Notice: Subject to any disclaimer, the term of this patent is extended or adjusted under 35 U.S.C. 154(b) by 108 days.

(21) Appl. No.: 16/371,000

(22) Filed: Mar. 31, 2019

(65) Prior Publication Data

US 2020/0308019 A1    Oct. 1, 2020

(51) Int. Cl.
*C02F 1/00* (2006.01)
*C02F 1/50* (2006.01)
(Continued)

(52) U.S. Cl.
CPC .............. *C02F 1/004* (2013.01); *B01D 35/02* (2013.01); *B01D 39/2068* (2013.01);
(Continued)

(58) Field of Classification Search
CPC ...... C02F 1/004; C02F 1/505; C02F 2303/04; C02F 2103/007; B01D 39/2068;
(Continued)

(56) References Cited

U.S. PATENT DOCUMENTS 5,250,094 A * 10/1993 Chung .................... F01N 3/032
55/523
2008/0317802 A1* 12/2008 Lee ......................... A01N 43/80
424/409

(Continued)

FOREIGN PATENT DOCUMENTS

KR         200399564 Y1 * 10/2005

*Primary Examiner* — Waqaas Ali
(74) *Attorney, Agent, or Firm* — Justin Lampel

(57) ABSTRACT

A liquid filter apparatus and system is provided. The liquid filter apparatus and system is especially suitable for purifying water. The apparatus and system may have a solid portion and/or a porous filter portion called a monolithic unit. The present apparatus and system is suitable for providing clean water for drinking, cooking, washing and other household, public, medical, agricultural and industrial uses. The present apparatus and system utilizes anti-bacterial, anti-viral, anti-fungal, anti-mold and/or other cleansing elements to purify the liquid. The liquid passing through the system must pass through the monolithic unit which is solid and porous therein contacting the antimicrobial material and/or antimicrobial components located within the monolithic unit. The apparatus and system provide a high hydraulic conductivity as a result of the solid and porous nature of the monolithic unit.

15 Claims, 11 Drawing Sheets

(51) Int. Cl.
  *B01D 39/20* (2006.01)
  *B01D 35/02* (2006.01)
  *C02F 103/00* (2006.01)
(52) U.S. Cl.
  CPC ...... *C02F 1/505* (2013.01); *B01D 2239/0442* (2013.01); *B01D 2239/0471* (2013.01); *B01D 2239/1291* (2013.01); *C02F 2103/007* (2013.01); *C02F 2303/04* (2013.01)
(58) Field of Classification Search
  CPC .... B01D 2239/0442; B01D 2239/0471; B01D 2239/1291; B01D 35/02
  See application file for complete search history.

(56) References Cited

U.S. PATENT DOCUMENTS

2009/0247399 A1* 10/2009 Mizutani ............. B01J 37/0244
  502/178
2011/0062065 A1* 3/2011 McCague ............... C02F 1/001
  210/167.1
2018/0318745 A1* 11/2018 Nichols .............. B01D 46/2414

* cited by examiner

| Major Large Pores | Interconnecting Pores | Cell Wall Porosity |
|---|---|---|
| 200-500 microns | 50-200 microns | 0.5 – 5 microns |

LIQUID FILTER APPARATUS AND SYSTEM

BACKGROUND OF THE INVENTION

A liquid filter apparatus and system is provided. The liquid filter apparatus and system is especially suitable for purifying water. The apparatus and system may have a solid portion and/or a porous filter portion called a monolithic unit. The present apparatus and system is suitable for providing clean water for drinking, cooking, washing and other household, public, medical, agricultural and industrial uses. The present apparatus and system utilizes anti-bacterial, anti-viral, anti-fungal, anti-mold and/or other cleansing elements to purify the liquid. The liquid passing through the system must pass through the monolithic unit which is solid and porous therein contacting the antimicrobial material and/or antimicrobial components located within the monolithic unit. The apparatus and system provide a high hydraulic conductivity as a result of the solid and porous nature of the monolithic unit. In particular, the monolithic unit provides a hierarchy of interconnected pores which results in superb mixing at a microscopic scale of the liquid as it passes through the monolithic unit of the system, exposing contaminants to the antimicrobial material or antimicrobial components located on pore surfaces of the monolithic unit to purify and sanitize the liquid.

Water filtration systems and water filters have been used for a long time. These prior art filtration systems and filters often use multiple filtering stages to provide clean water for drinking, cooking, washing and other household, public, medical, agricultural and industrial uses. One of the key requirements in a water filter or water filtration system is providing anti-bacterial, anti-viral, anti-fungal, anti-mold, and similar functionality, which is generally referred to as antimicrobial. Water filters or filtration systems that employ antimicrobial agents to reduce microbes in water systems play a valuable role in producing a healthier environment and better tasting water. Furthermore, there is an increasing need to treat wastewater to reduce its microbial load before it is released into the environment. Prior water filtration system requirements include removing: a) pathogens (e.g., bacteria, virus, spores, etc.), b) organic and inorganic soluble materials, and c) organic and inorganic insoluble materials in the water and resulting odors from these contaminants.

Prior art water filtration technologies exist for removing harmful and other microbes from a water supply system. Many of these systems use chemicals to kill the pathogens, e.g., chlorine, iodine, etc. Such systems add chemicals to the water stream to kill the pathogens and these chemicals may then have to be removed in further filtration processes. Alternatively, or in conjunction with chemical treatment, some water filtration systems may use UV illumination systems or ozone to kill microbes. UV and ozone processes are expensive to operate on a continuous basis and over long-time frames because electricity is used to generate the UV light or ozone. The UV rays may not kill microbes shielded by suspended particles or coatings on glass that block UV rays, reducing system efficiency. Similarly, ozone systems can be ineffective if the microbes are shielded by particulate in the water. Furthermore, these systems can be less reliable due to bulb or electricity failure relative to other water systems and other liquid filtering systems.

Prior water and liquid filtration systems often use a number of different types of mechanical filter agents. For example, paper or treated paper may be used as a filter element for use in a cartridge type filter. In another case, the cartridge element can be made from treated yarns wound on a mandrel. Still other filtering mechanisms may include sand, rock, charcoal, metal screens, polymer screens or the like. The salient feature of these filter designs is that the filtering medium must be contained within a housing (e.g. enclosure) so that the liquid stream can be directed through the filtering medium.

The prior art filter media described above are generally composed of discrete components that are placed within a housing to direct the liquid through the filter media. Alternative filter media may be made of solids such as porous ceramic, cementitious materials, granular porous media, metals, metallic materials, glass, polymer, inorganic polymer, inorganic polymer bonded product, organo-metallic materials, or blends of these materials which contain antimicrobial agents. These filter media can be manipulated as single units or multiple units that are attached to each other in either serial or parallel or both flow configurations. However, when these solid but porous units are inserted in a filter housing, some fraction of the flowing liquid will contact the solid and porous filter media, and some liquid will also flow through gaps between solids and along the perimeter or circumference of the solid and porous filter media. This allows some of the liquid to bypass the filter media. If the filter is used to remove pathogens or chemicals from the liquid, some of these materials will remain within the liquid after the liquid passes through the filter stage, effectively reducing the filter performance.

In the present application, the terms filtering, cleaning, sanitization, sanitizing, disinfection, and purification are used interchangeably to describe the function of reducing the level of pathogens and microbial material in the liquid.

In the present application, the terms filtering, cleaning and purification are used interchangeably to describe the function of reducing the level of particulates, chemicals, impurities, ions, organics and inorganics in the liquid.

In the present application, the terms polymer and plastic are used interchangeably to describe the organic host matrix and the coatings.

In the present application, the terms porous ceramic, inorganic polymer, inorganic polymer bonded product, granular porous media, and cementitious materials, metals, metallic materials, glass, polymer, inorganic polymer, inorganic polymer bonded product, organo-metallic materials, or blends of these materials which contain anti-microbial agents are used interchangeably to describe materials such as are subject of this patent, whether granular or monolithic in shape.

In the present application, the terms turbulence, laminar flow, intense mixing and superb mixing are used interchangeably to describe liquid mixing.

However, these prior art filters and systems fail to describe a liquid filter apparatus and system which is easy to use and efficient as is described in the present application. A need, therefore, exists for an improved liquid filter apparatus and system.

SUMMARY OF THE INVENTION

A liquid filter apparatus and system is provided. The liquid filter apparatus and system is especially suitable for purifying water. The apparatus and system may have a solid portion and/or a porous filter portion called a monolithic unit. The present apparatus and system is suitable for providing clean water for drinking, cooking, washing and other household, public, medical, agricultural and industrial uses. The present apparatus and system utilizes anti-bacterial, anti-viral, anti-fungal, anti-mold and/or other cleansing elements to purify the liquid. The liquid passing through the system must pass through the monolithic unit which is solid and porous therein contacting the antimicrobial material and/or antimicrobial components located within the monolithic unit. The apparatus and system provide a high hydraulic conductivity as a result of the solid and porous nature of the monolithic unit. In particular, the monolithic unit provides a hierarchy of interconnected pores which results in superb mixing at a microscopic scale of the liquid as it passes through the monolithic unit of the system. The antimicrobial material or antimicrobial components located on pore surfaces of the monolithic unit purify and sanitize the liquid.

The present apparatus and system may use a housing to hold the monolithic unit. The housing may have a liquid impermeable sealed portion and may have two or more openings for allowing liquid to pass completely through the monolithic unit. The main body of the monolithic unit wherein the liquid passes through may be porous ceramic, granular porous media, or cementitious material.

In one embodiment, the monolithic unit may have a portion having a coating, located at the exit opening of the housing, to provide directionality and to control the flow of the liquid entering the monolithic unit as the liquid exits the housing.

In an embodiment, the monolithic unit (and further the housing) may be, for example, a square, a cube, a rectangle, a pyramid, a hexagon, an octagon, a polyhedron, a rhombus, a tetrahedron, a trigonal, a trapezoid, a spherical, a ring, a rod, a disk or a tube in shape or cross-section.

In an embodiment, the monolithic unit may contain, for example, antimicrobial agents which are bound to the internal and external surface areas of the monolithic unit so as to reduce pathogen loads in the treated liquid. The antimicrobial agents may contain, for example: a) metallic silver, copper or zinc or blends or alloys, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

In an embodiment, a liquid impermeable coating may be applied to a portion of the surface of the monolithic unit wherein the liquid impermeable coating may be a polymer coating, a polyurethane coating, an epoxy coating, a PVC coating, a rubber coating, a thermoplastic coating, or a thermoset coating. The coating may be applied to the monolithic unit as a liquid. The coating may also contain antimicrobial agents containing, for example: a) metallic silver, copper or zinc or blends, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

In another embodiment, the liquid impermeable coating may be a polymer coating, a polyurethane coating, an epoxy coating, a PVC coating, a rubber coating, a thermoplastic coating, or a thermoset coating where the coating may be applied as a solid sleeve and held in place with a friction fit, a clamp or other mechanical means or an adhesive agent between a solid sleeve and the monolithic unit. The coating may also contain antimicrobial agents containing, for example: a) metallic silver, copper or zinc or blends, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

In another embodiment of the present apparatus and system is that the monolithic unit may be comprised of, for example, a solid porous ceramic, granular porous media, cementitious material, inorganic polymer, inorganic polymer bonded product or cementitious bonded materials, metals, metallic materials, glass, polymer, inorganic polymer, organo-metallic material or blends of these materials. A salient feature of these porous filter materials is that methods used to produce these products provide enhanced hydraulic properties while also containing a uniform distribution of antimicrobial materials or antimicrobial components on available pore surfaces. That is, they have high hydraulic conductivity (e.g., water flow) across surfaces containing antimicrobial materials or antimicrobial components. The high hydraulic conductivity arises from a hierarchy of interconnected pores within the monolithic unit that creates superb mixing at a microscopic scale conditions for liquid flow. The pores of the monolithic unit may also provide increased surface area for supporting antimicrobial materials or antimicrobial components, which is a key to killing pathogens.

In another embodiment of the invention, the high hydraulic conductivity and increased surface area of the monolithic unit may be formed from, for example, a porous ceramic material that may be unfired or inorganic bonded ceramic material and does not require post-processing to develop the high hydraulic conductivity. The unfired porous ceramic surfaces may contain antimicrobial agents such as: a) silver, copper or zinc metals or blends, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

In another embodiment of the apparatus and system, the high hydraulic conductivity and increased (large) surface area of the monolithic unit may be formed from a porous ceramic material that is unfired or inorganic bonded ceramic material and does not require post-processing to develop the high hydraulic conductivity.

The unfired porous ceramic comprising the monolithic unit may contain antimicrobial agents on available surfaces such as: a) silver, copper or zinc metals or blends, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors. The monolithic unit may be constrained by a housing, or framework within the housing, that contains pockets to hold the monolithic unit. The monolithic unit elements may be coated or they may not be coated with a water impermeable coating. The pockets may be square, rectangle, pyramid, hexagon, octagon, polyhedron, rhombus, tetrahedron, trigonal, trapezoid, circular, spherical, ring, rod disk or tube or any other shape or cross-section.

The embodiments of this concept in which an exclusive property or privilege is identified are defined as follows:

Cylinders or other container shapes that are filled with single pieces of the monolithic unit(s) or granules or pieces of the monolithic unit containing dispersed antimicrobial additive on the surface of the pores (holes) and bulk material or combinations of solid and granular monolithic unit and used together.

In an embodiment, the monolithic unit may have a liquid impermeable coating at the opening and exiting portions of the housing.

In an embodiment, the housing may contain multiple monolithic units having liquid impermeable coatings where the monolithic units form may be that of a square, a cube, a rectangle, a pyramid, a hexagon, an octagon, a polyhedron, a rhombus, a tetrahedron, trigonal, trapezoid, spherical, ring, rod, disk and/or tube-shaped or in cross-section.

In an embodiment, the monolithic unit(s) may contain a liquid impermeable coating where the coating can be a polymer coating, a polyurethane coating, an epoxy coating, a PVC coating, a rubber coating, a thermoplastic coating, or a thermoset coating. The coating may also contain antimicrobial materials or antimicrobial components including: a) metallic silver, copper or zinc or blends or alloys, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

In an embodiment, the monolithic unit(s) having a liquid impermeable coating achieves a reduction in microbial concentration of at least 90%.

In an embodiment, the monolithic unit having a liquid impermeable coating may take the form of bulk materials, film materials, sheet materials, composite materials, rod materials, disk materials, ring materials, spherical materials, polygonal materials, cubic materials, etc.

In an embodiment, the monolithic unit having a liquid impermeable coating may be comprised of a thermoplastic host matrix including polyethylene (PE), polypropylene (PP), polycarbonate (PC), polystyrene (PS), polyamides (PA), polybutylene terephthalate (PBT), thermoplastic polyurethane (TPU) and polyethylene terephthalate (PET). The host matrix polymer may be a single polymer, a polymer blend, a co-polymer, or a co-polymer blend.

In an embodiment, the monolithic unit having a liquid impermeable coating may be comprised of a thermoset host matrix including phenolics, cyanate esters, bismaleimides, polyimides, acrylics, silicones, urethanes, polyurethane (PU) and latexes. The host matrix polymer may be a single polymer, a polymer blend, a co-polymer, or a co-polymer blend.

In an embodiment, the monolithic unit having a liquid impermeable coating may be comprised of a host inorganic polymer bonded matrix incorporating at least one distributed metal type of organo-metallic additive or a blend of organometallic additives of more than one type of metal from the category of metals, transition metals, post-transition metals, metalloids, lanthanides, actinides, alkali metals, and alkaline earth metals, said organo-metallic additives imparting antimicrobial properties to the bulk and surface of the cementitious matrix in the form of bulk materials, film materials, sheet materials, composite materials, rod materials, disk materials, ring materials, cubic materials or spherical materials.

In an embodiment, the monolithic unit having antimicrobial materials incorporated into the monolithic unit may be a ceramic or inorganic polymer, inorganic polymer bonded product, or cementitious material including a) metallic silver, copper or zinc or blends or alloys, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

For a more complete understanding of the above listed features and advantages of the present liquid filter apparatus and system reference should be made to the detailed description and the detailed drawings. Further, additional features and advantages of the invention are described in, and will be apparent from, the detailed description of the preferred embodiments.

BRIEF DESCRIPTION OF THE DRAWINGS

A liquid filter apparatus and system is provided. The liquid filter apparatus and system is especially suitable for purifying water. The apparatus and system may have a solid portion and/or a porous filter portion called a monolithic unit. The present apparatus and system is suitable for providing clean water for drinking, cooking, washing and other household, public, medical, agricultural and industrial uses. The present apparatus and system utilizes anti-bacterial, anti-viral, anti-fungal, anti-mold and/or other cleansing elements to purify the liquid. The liquid passing through the system must pass through the monolithic unit which is solid and porous therein contacting the antimicrobial material and/or antimicrobial components located within the monolithic unit. The apparatus and system provide a high hydraulic conductivity as a result of the solid and porous nature of the monolithic unit. In particular, the monolithic unit provides a hierarchy of interconnected pores which works as a micro-reactor that provides liquid/solid interfaces where deactivation of microbes/bacteria in flow of the liquid as it passes through the monolithic unit of the system, which increases removal rates by the antimicrobial material or antimicrobial components located on pore surfaces of the monolithic unit to purify and sanitize the liquid.

DETAILED DESCRIPTION OF THE PREFERRED EMBODIMENTS

A liquid filter apparatus and system is provided. The liquid filter apparatus and system is especially suitable for purifying water and may have a solid or porous filter. The present apparatus and system is suitable for providing clean water for drinking, cooking, washing and other household, public, medical, agricultural and industrial uses. The present apparatus and system utilizes anti-bacterial, anti-viral, anti-fungal, anti-mold and other cleansing elements to purify the liquid. The solid and porous liquid filter media unit may be used without the liquid bypassing the antimicrobial material or antimicrobial components located within the porous monolithic unit. The high hydraulic conductivity of the solid and porous monolithic unit arises from the hierarchy of interconnected pores as a result of superb mixing at a microscopic scale of the liquid as it passes through the porous filter media of the system in conjunction with the antimicrobial material or antimicrobial components located on pore surfaces of the filter.

Figure 1:
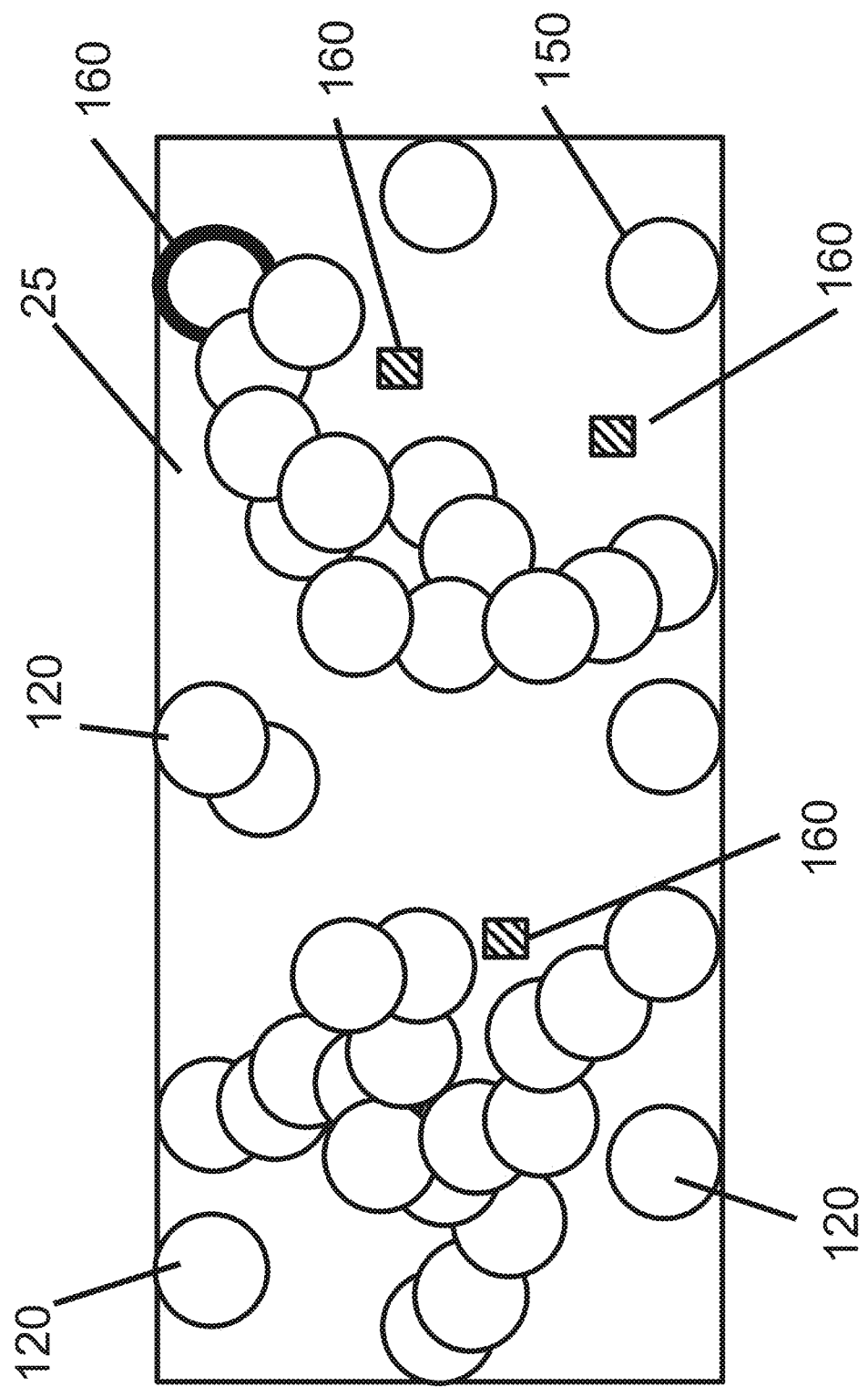
FIG. 1 shows the monolithic unit with interconnected pore holes and a dispersed antimicrobial additive.
Figure 4:
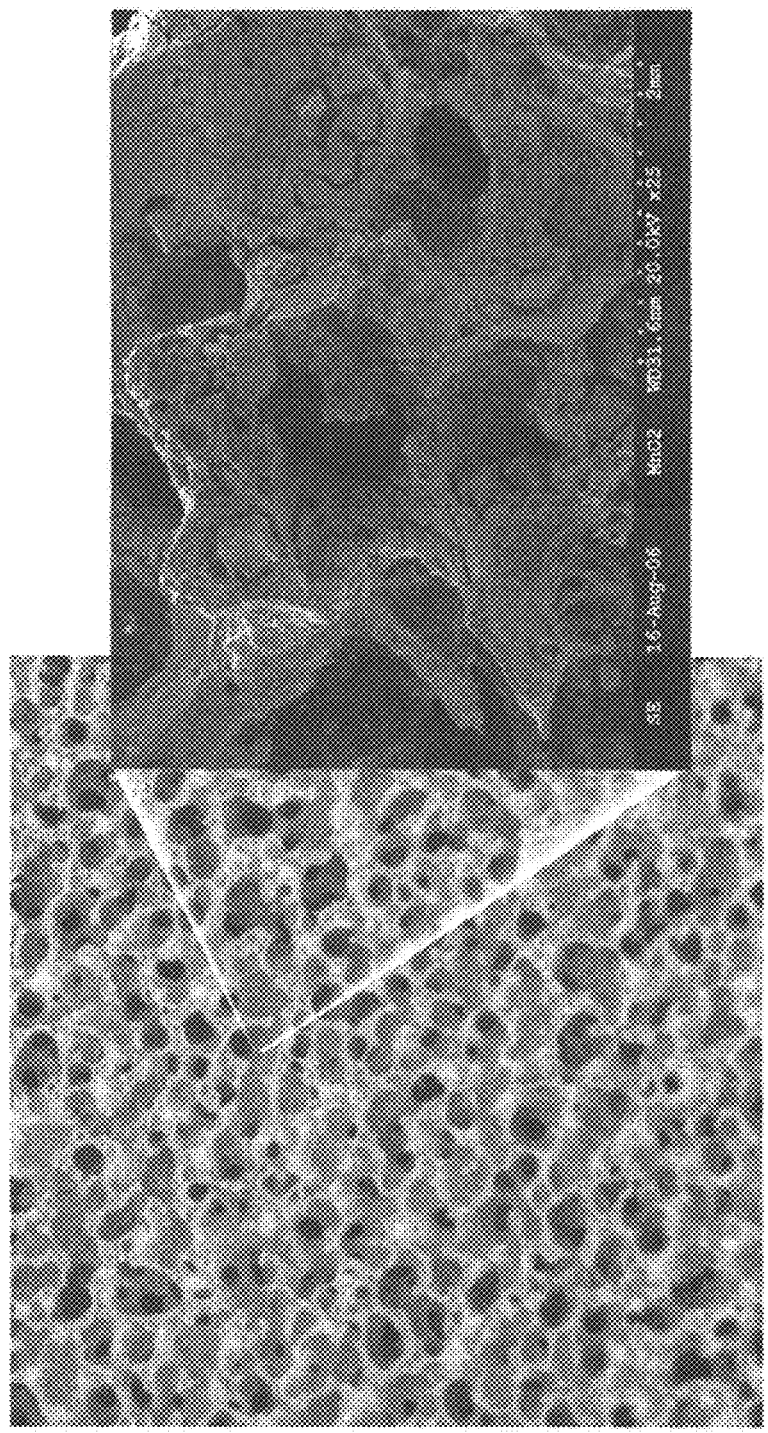
FIG. 4 shows micrographs of actual pores of the monolithic unit that show the size diversity and interconnectivity of the hierarchical pore structure that typically contains over 80% porosity.
Figure 5:
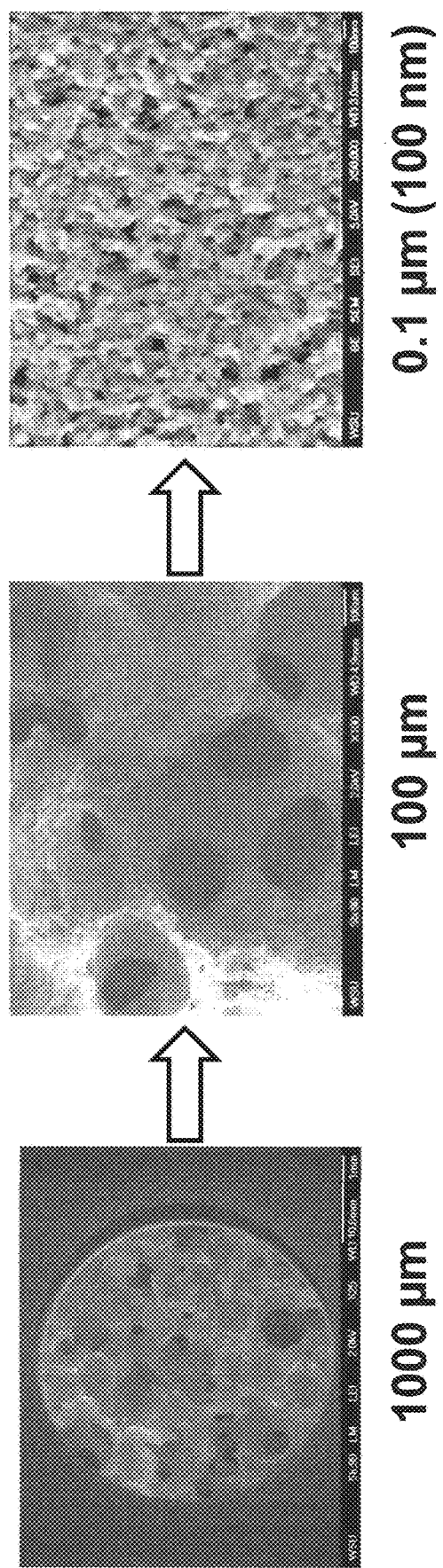
FIG. 5 shows micrographs of actual pores of the monolithic unit that show the size diversity and interconnectivity of the hierarchical pore structure that typically contains over 80% porosity.
Figure 9:
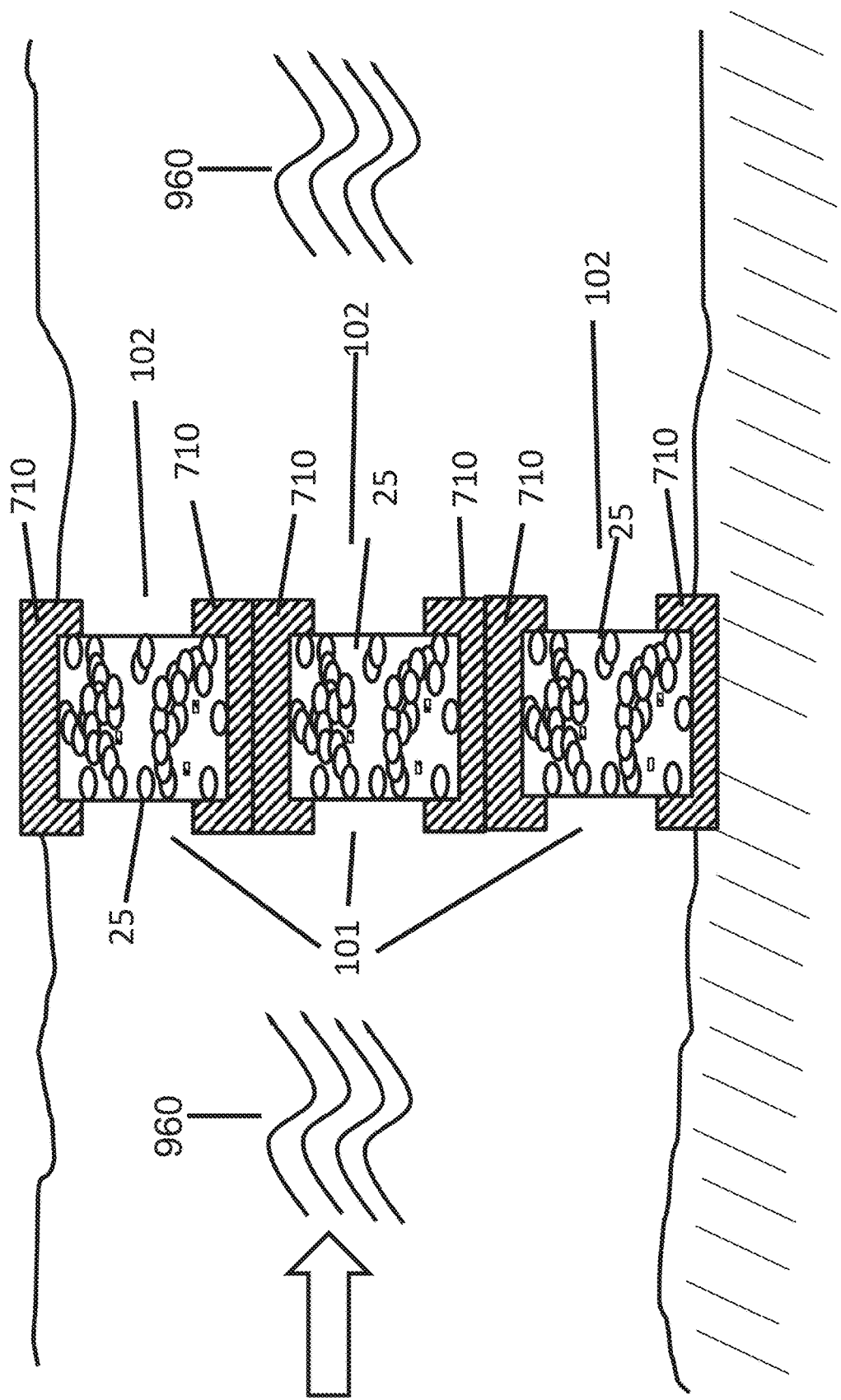
FIG. 9 shows multiple housings, each holding a monolithic unit wherein the multiple housings and monolithic units are stacked together for provide a great purifying surface in a natural environment in one embodiment.

Referring first to FIG. 1, in an embodiment, the present apparatus and system may consist of a monolithic unit 25. The monolithic unit 25 may have solid and porous portions having pores 120. FIG. 1 depicts a cross section through the monolithic unit 25 in one embodiment. The micrographs shown in FIGS. 4 and 5 illustrate the level, size, and interconnectivity of pores 120 needed to produce a pore surface area exceeding 5 m$^2$/gram found in the monolithic unit 25. The monolithic unit 25 may have a bulk portion 110 and a pore portion 120 wherein the bulk portion 110 supports the pore portion 120. As shown in the figures, in an embodiment, the monolithic unit 25 may have interconnected pores 120 in addition to free standing pores 120. The pores 120 may allow passage of the liquid 960 through the monolithic unit 25. In an embodiment, the liquid 960 may be water 960 as shown in FIG. 9 (in the FIG. 9 drawing, the liquid 960 is water running in a river; however, the liquid 960 could be another liquid and may be located in another location, such as a pipe).

In an embodiment, the pores 120 may have internal surfaces 150. Because the antimicrobial material 160 is spread through the monolithic unit 25 the internal surfaces 150 of the pores 120 may therefore may contain antimicrobial materials 160. The antimicrobial material 160 may make contact with the liquid 960 that flows through the pores 120 to kill pathogens located within the liquid 960. The amount of porosity of the monolithic unit 25 is generally between 70% and 90%, but typically 80%, while the variety of pore 120 sizes and their interconnectivity creates a hierarchical structure that permits liquid 960 to fill almost all pores 120. In an embodiment, the surface area of the monolithic unit 25 with the pores 120 available to hold antimicrobial material 160 exceeds 5 m$^2$/gram and can exceed 50 m$^2$/gram. Antimicrobial material 160 may also be present in the bulk host, which is not in contact with the liquid 960.

While FIG. 1 depicts a rectangular shaped monolithic unit 25, other shapes for the monolithic unit 25 are useable including square, cubic, pyramid, hexagon, octagon, polyhedron, rhombus, tetrahedron, trigonal, trapezoid, spherical, ring, rod disk or tube depending on the specific needs.

Figure 7A:
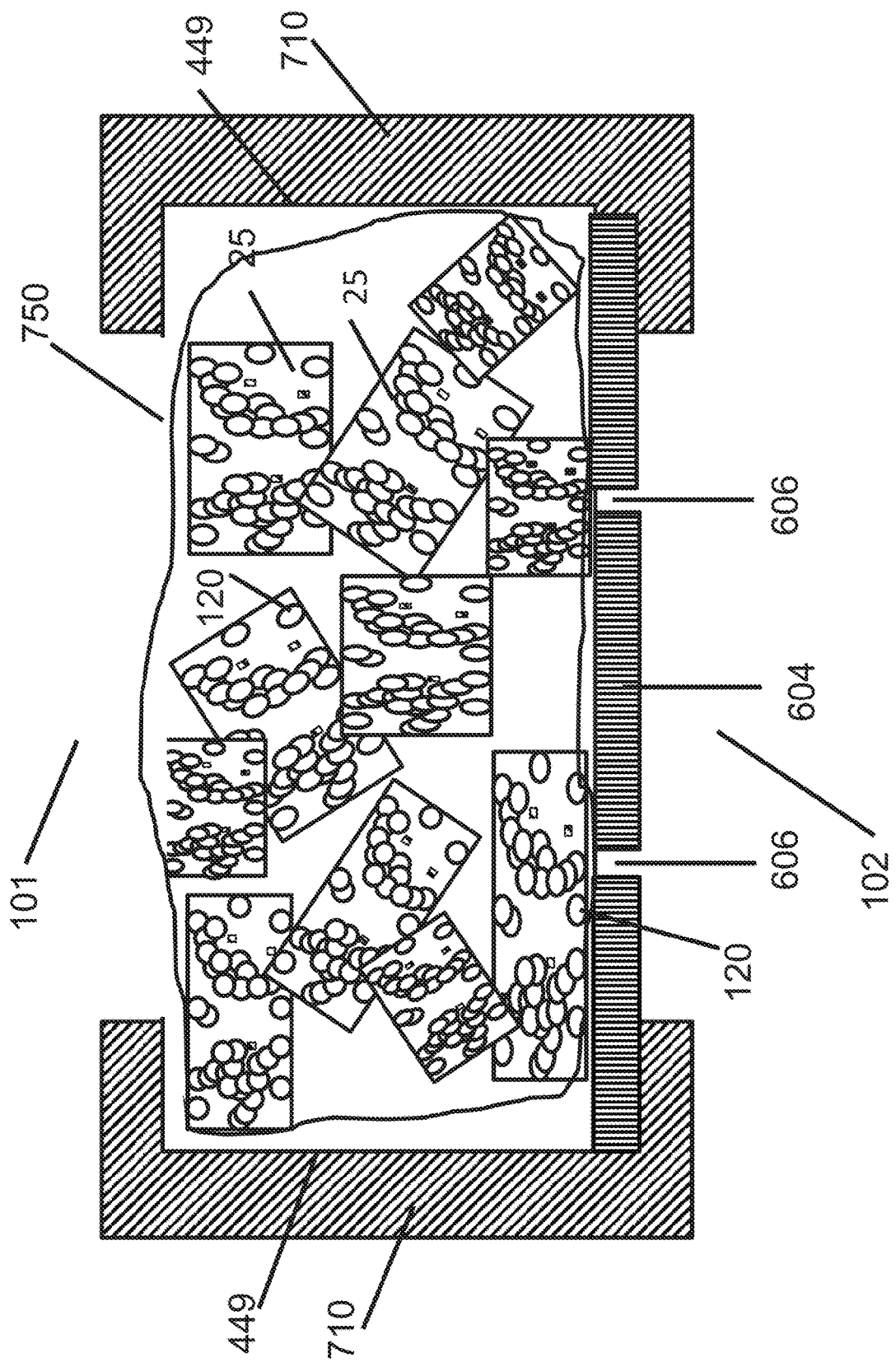
FIG. 7A shows a housing holding multiple monolithic units within a bag in the housing in one embodiment.
Figure 7B:
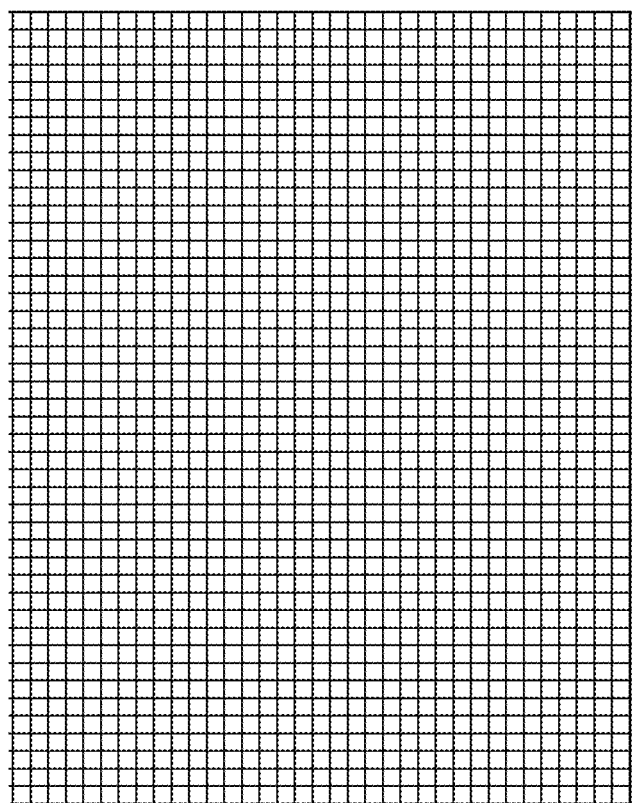
FIG. 7B illustrates the screen in one embodiment.

In an embodiment, a housing 710 (FIG. 7) may physically hold and secure the monolithic unit 25. In an embodiment, the monolithic unit 25 may be permanently bonded to the housing 710 that controls and guides the liquid 960. The housing 710 may have an opening (for liquid entry) 101, an exit (for liquid exiting) 102 and a perimeter surface. In one embodiment, the housing 710 may also have a liquid impermeable section 449 which does not allow liquid 960 to pass through. FIG. 7 illustrates the opening 101 on the top of the housing 710 and the exit 102 on the bottom of the housing 710; however, the opening 101 and exit 102 may be located at different locations.

In an embodiment, liquid 960 may only enter the housing 710 through the pores 120 at the opening 101 of the housing 710 which contacts the liquid 960. The liquid 960 may then flow through the interconnected pores 120 that contain an antimicrobial surface 160 that kills pathogens in the liquid 960. The liquid 960 may exit the housing 710 at the exit 102. In an embodiment, as shown in FIG. 9, all the liquid 960 must pass through the monolithic unit 25 in a closed system, such as an underwater tunnel or pipe, to get from one side of a tunnel or pipe to the other side. As a result, all the liquid 960 undergoes the purification process in the system.

The hierarchical nature of the interconnected porosity of the pores 120 creates superb mixing at a microscopic scale of the liquid 960 as it flows through the pore channels within the monolithic unit 25. The intense mixing of flowing liquid 960 enhances the contact of pathogens to be killed to the monolithic unit 25 as liquids 960 pass across the antimicrobial surfaces 160 of the monolithic unit 25. The high surface area containing antimicrobial materials 160, combined with intense mixing created by the interconnected porosity of the pores 120, creates favorable conditions to kill pathogens effectively at short contact times.

Liquid 960 that exits the pores 120 at the perimeter 104 of the monolithic unit 25 may still contain pathogens that have not yet been killed due to the shortened traverse through the interconnected pores 120. This represents a leakage path of pathogen containing liquid 960 that migrates along the perimeter surface 103 of the monolithic unit 25 and mixes with the pathogen free liquid 960 at the exit 102, reducing the filter efficiency.

To address the concern of liquid 960 exiting the monolithic unit 25 at an undesired location on the monolithic unit 25, such as along the perimeter surface 200, the monolithic unit 25 may have a liquid impermeable coating 210. This liquid impermeable coating 210 may be, for example, a polymer coating, a polyurethane coating, an epoxy coating, a PVC coating, a rubber coating, a thermoplastic coating, or a thermoset coating. The liquid impermeable coating 210 may also contain antimicrobial materials 160 or antimicrobial components to impart an antimicrobial functionality to the liquid impermeable coating 210.

Figure 2:
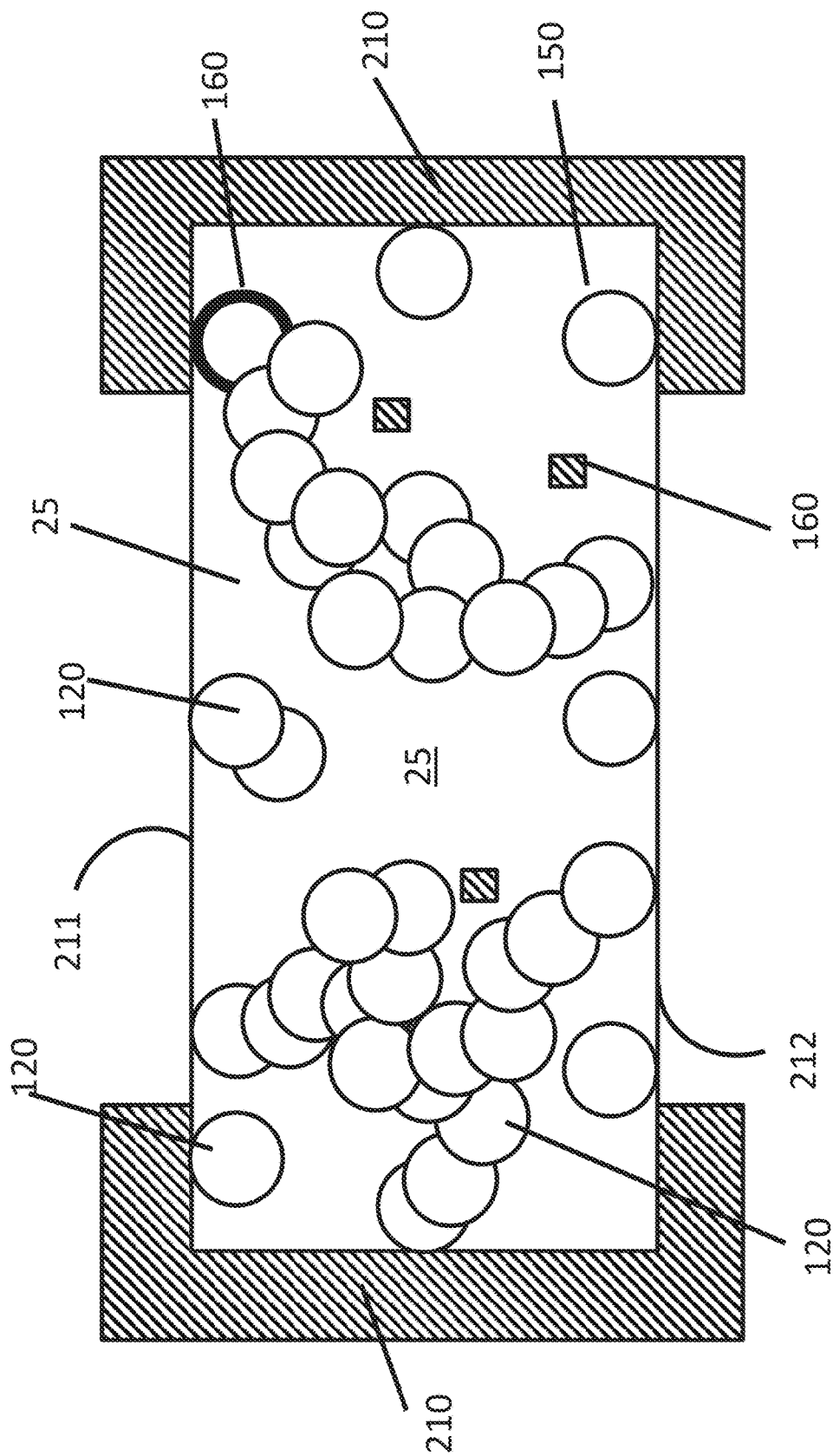
FIG. 2 shows the monolithic unit with interconnected pore holes and a dispersed antimicrobial additive and with a liquid impermeable coating.

Because it is desired for the liquid 960 to pass through the monolithic unit 25 at specific locations, the liquid impermeable coating 210 may not be placed all over portions of the monolithic unit 25. In particular, FIG. 2 shows that the liquid impermeable coating 210 may be placed at, for example, the sides of the monolithic unit 25 and wherein a portion of the top (the 'opening') 211 and a portion of the bottom (the 'exit') 212 of the monolithic unit 25 may lack the liquid impermeable coating 210 such that the liquid 960 may therein enter and exit the monolithic unit 25 at the portions not covered by the liquid impermeable coating 210. It should be understood that the location of the opening and exit may vary depending on the specific need. In an embodiment wherein a housing 710 is used to secure the monolithic unit 25, as is shown in FIG. 7, the liquid impermeable coating 210 of the monolithic unit 25 may not be placed over the opening or some of the opening 101 and the exit or some of the exit 102 of the housing 710.

Figure 3:
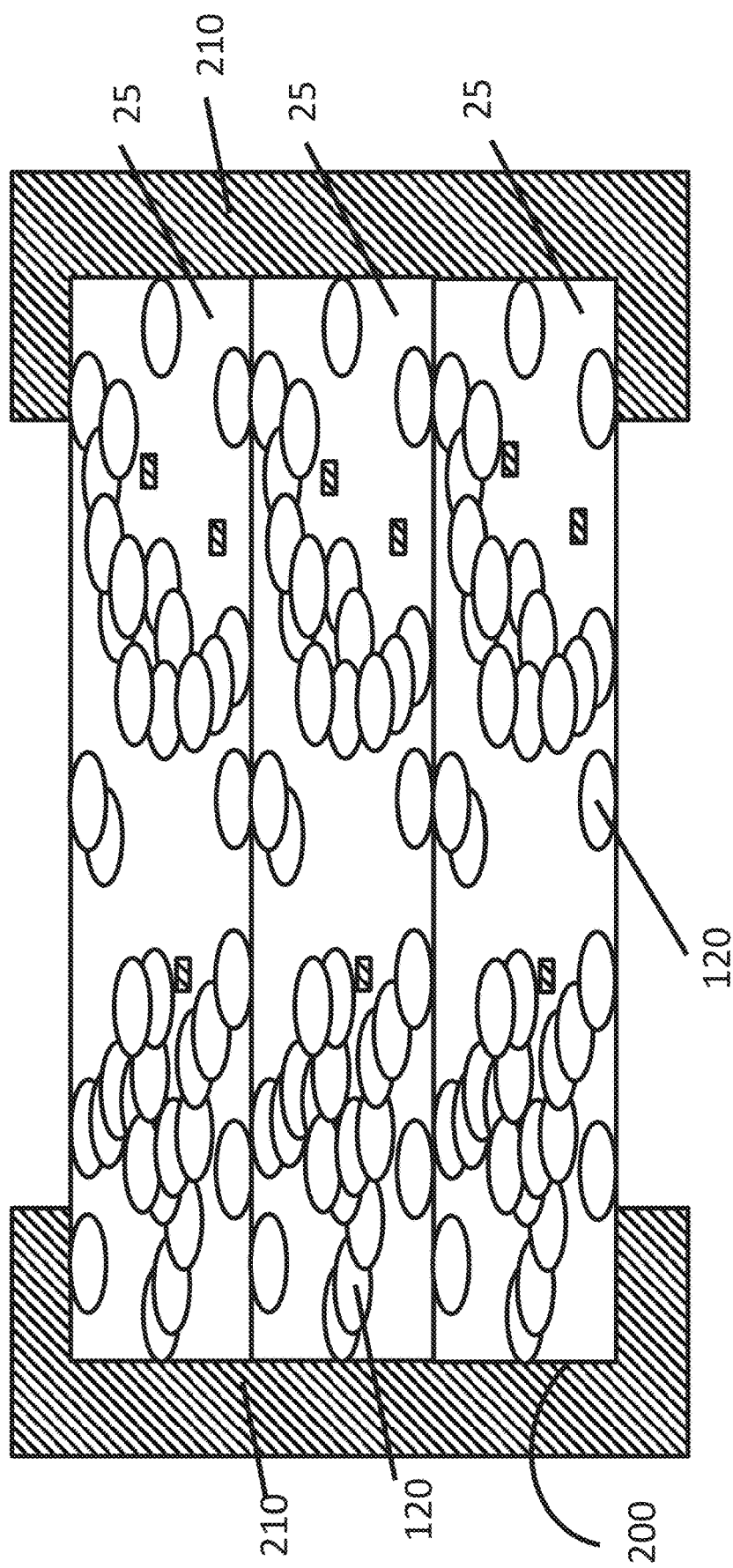
FIG. 3 shows multiple monolithic units located within a single housing wherein the interconnected pores and dispersed antimicrobial additives are located in the monolithic units and wherein a liquid impermeable coating added to the housing.

FIG. 3 shows one embodiment of the system wherein multiple monolithic units 25 are used in conjunction with each other. In this embodiment, the liquid 960 may be required to pass through all the monolithic units 25. The benefit of the multiple monolithic units 25 used in conjunction with each other is that one or more of the monolithic units 25 may be replaced while an operator may keep some of the monolithic units 25 in operation. FIG. 3 illustrates three monolithic units 25 shown in a series assembly, but other assemblies are possible, such as parallel structures, and mixed parallel and series structures. Further, more or less than three monolithic units 25 may be used together. In some embodiments, the liquid impermeable coating 210 may be placed between the monolithic unit 25 and/or the housing 710 and mechanical plumbing couplings to ensure that the liquid 960 does not bypass the monolithic unit 25.

Figure 6:
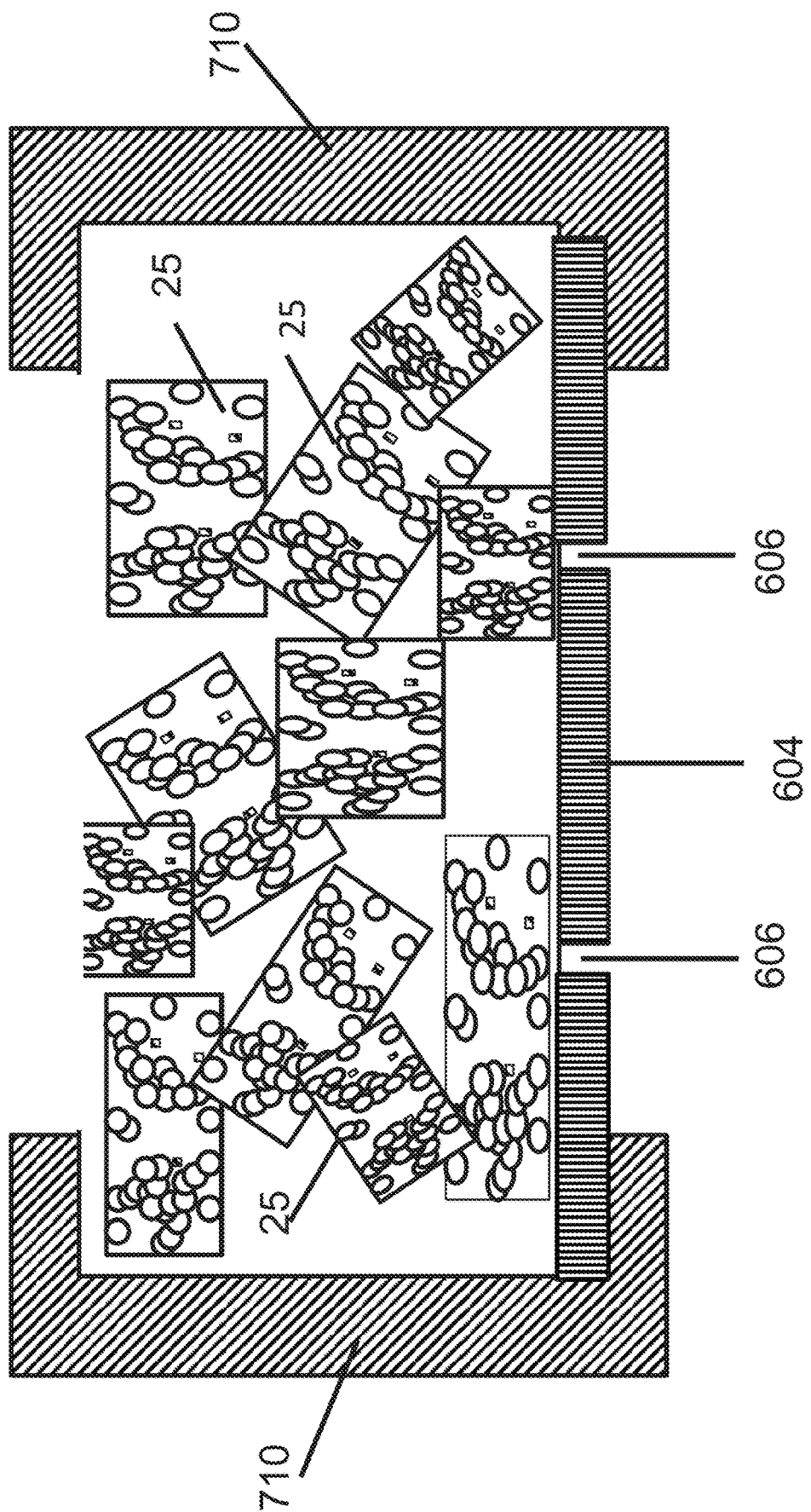
FIG. 6 shows a housing holding multiple monolithic units and a screen located at the exit opening of the housing in one embodiment.

In another embodiment as shown in FIG. 6, the monolithic unit 25 may be contained within a housing 710 having an optional screen 604 with holes 606. FIG. 6 illustrates the optional screen 604 located at the exit 102 of the housing 710; however, the optional screen 604 may be also placed at the opening 101 of the housing 101. The optional screen 604 may be made of a perforated or an open fabric material that allows the liquid 960 to pass through, while preventing contaminants from passing through the exit 102 of the housing 710.

As also shown in FIG. 6, in one embodiment, the housing 710 may contain multiple monolithic units 25 which are randomly inserted into the housing 710. In this embodiment, the multiple monolithic units 25 are positioned between the opening 101 and the exit 102 of the housing 710.

In another embodiment as shown in FIG. 7, multiple monolithic units 25 may be secured within a porous bag 750 that is placed in the housing 710. The bag 750 may constrain undesired granules or contaminants so they cannot exit the housing 710 through the exit 102 and pass into the purified liquid flow.

Figure 8:
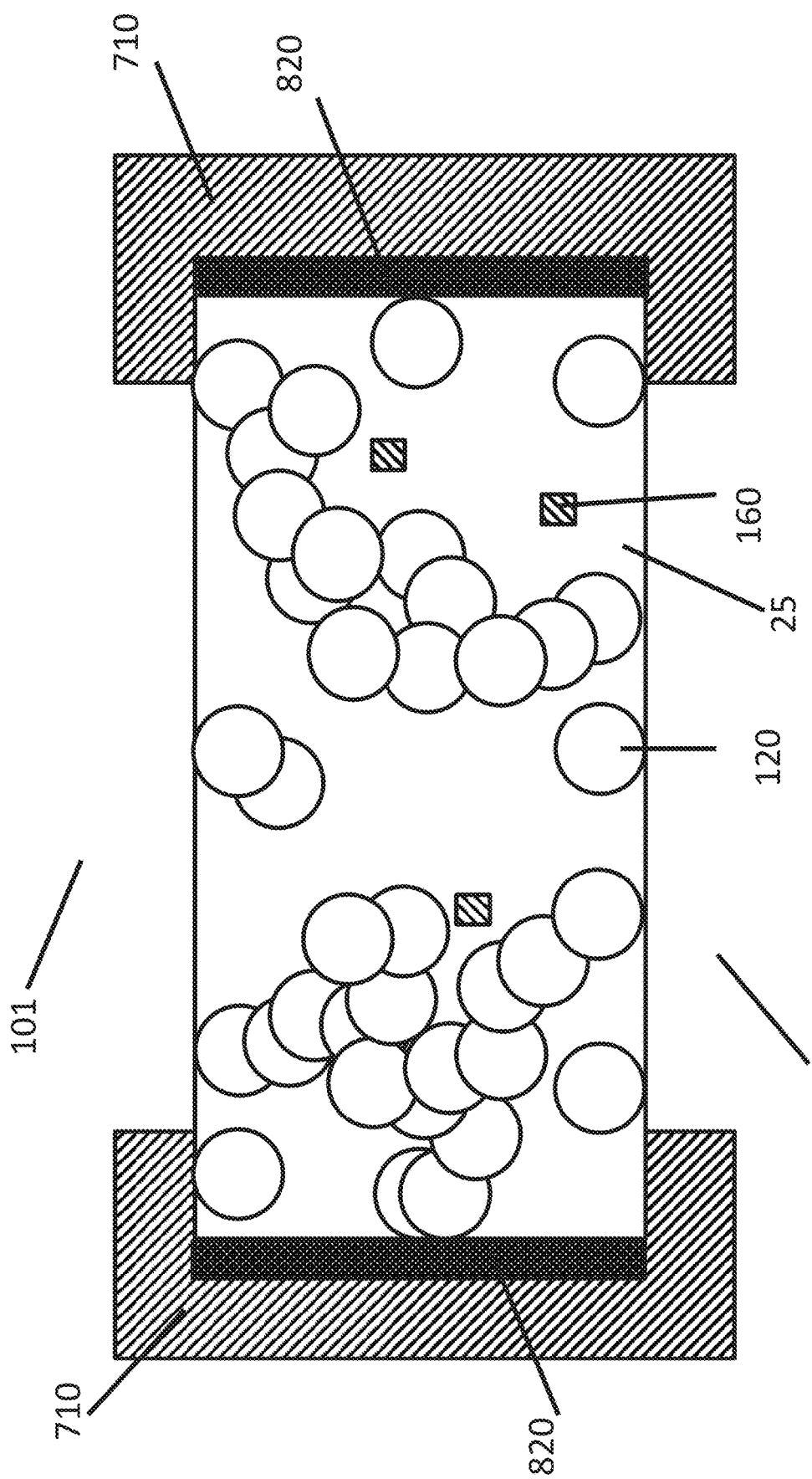
FIG. 8 shows a mechanical framework for constraining the monolithic unit within the housing wherein the mechanical framework acts as a pocket in the housing in one embodiment.

In another embodiment, FIG. 8, the monolithic unit 25 may be placed in a housing 710 wherein the housing has a pocket 820. The pocket 820 may be a sealed space between the housing 710 and the surface of the monolithic unit 25. The housing 710 may be corrosion resistant and may be made from a polymer, a polyurethane, an epoxy, a PVC, a rubber, a thermoplastic, a thermoset, fiberglass, co-polymers, concrete, wood, wood treated to prevent rotting, a metal or an alloy, (e.g., stainless, steel, copper, aluminum, brass, bronze, Inconel, et.) or other materials. The housing 710 may also be coated (e.g., painted, powder coated, thermal spray coated, polymer coated, etc.) to prevent or reduce corrosion.

Referring now to FIG. 9, in an embodiment, multiple housings 710 may be used in the system. FIG. 9 illustrates three housings 710 used, but any number of housings 710 may be used depending on the specific need.

Figure 10:
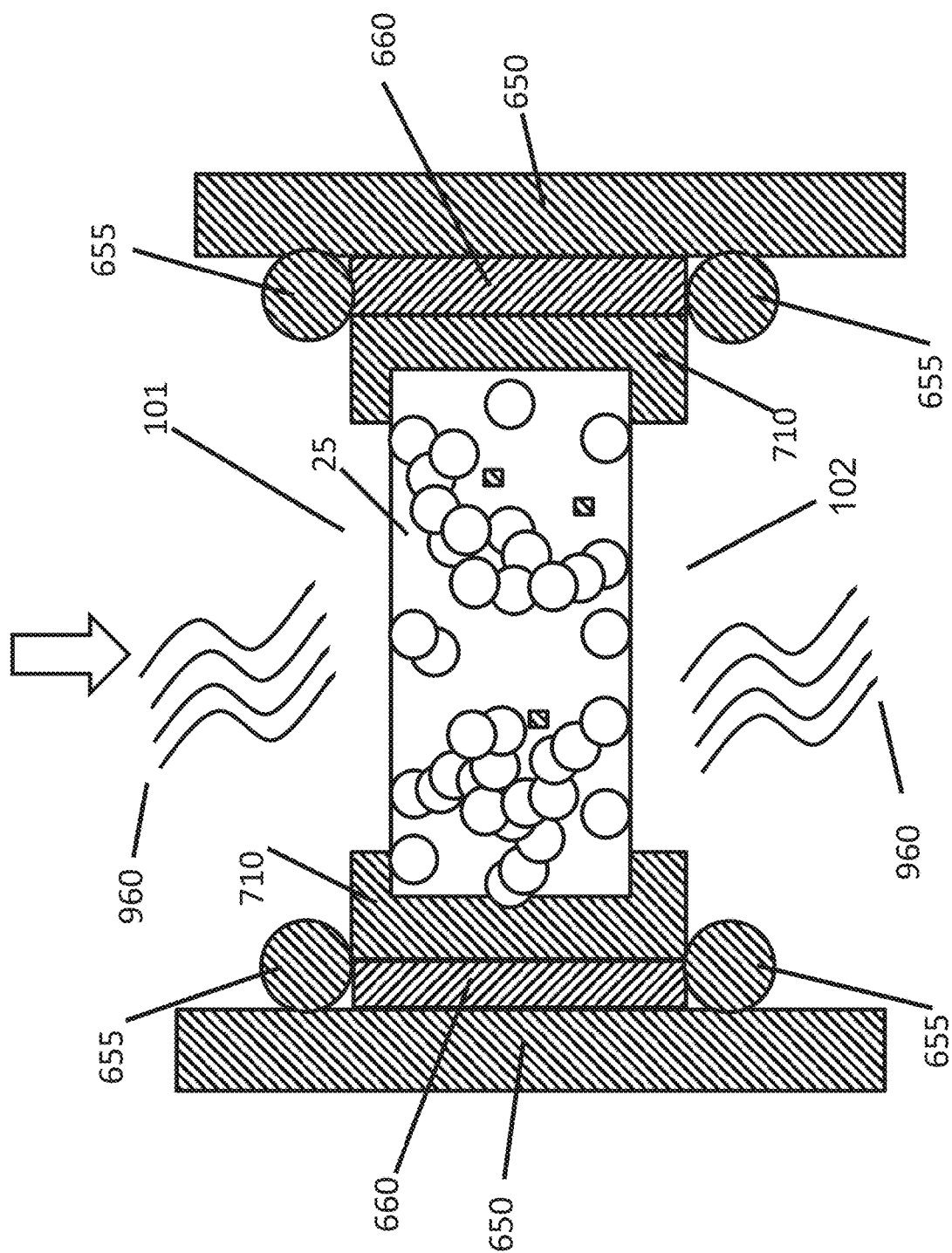
FIG. 10 illustrates the monolithic unit having gaskets in one embodiment.

Referring now to FIG. 10, in one embodiment, the monolithic unit 25 may be in a housing 710 and the housing 710 may be securely located within a pipe 650. A gasket 655 may be located between the pipe 650 and the housing 710 to prevent liquid 960 from passing through the pipe 650 without passing through the monolithic unit 25. The gasket 655 may be an o-ring, a silicone caulk or other such liquid sealing material or mechanism. Further, in an embodiment, an additional adhesive 660 may be used to secure the housing 710 within the pipe 650 and to further prevent the liquid 960 from passing through the pipe 650 without passing through the monolithic unit 25 for purification.

In one embodiment, MetaMateria inorganic polymer bonded porous samples containing antimicrobial agents used in DMRI antimicrobial NOVEX-AMG® were prepared. The samples were sent to a third-party laboratory to test via the ASTM International Method E1249 "Shake-Flask" protocol. Results indicated a greater than 90% reduction in $E.\ coli$, the pathogen under test.

In another example, MetaMateria inorganic polymer bonded porous samples were prepared as discs using another antimicrobial material. These discs were sealed into a plastic cylinder that required all liquid to flow through the disc. Water flow through this sample exceeded 90 Liters/hour. This sample was tested at a third-party laboratory and found to reduce >99.99% of $E.\ coli$, the pathogen under test.

The physical size, shape, density, porosity and composition of the monolith units may be designed and engineered to improve the performance of the filter for specific applications. Further, the present apparatus and system may provide for construction of a monolithic unit that may be used without liquid bypassing the antimicrobial material or antimicrobial components located within the pores of the monolithic unit. This increases the filter efficiency for sanitizing liquids that flow through it. For the sealed disc example described previously, the contact time of the liquid passing through the monolithic unit was less than 10 seconds to reduce pathogens by >99.99%. The monolithic unit system may be cost-effectively manufactured in a broad range of form factors with a variety of antimicrobial materials or antimicrobial components bonded at pore surfaces in a structure containing much higher surface area than most other porous materials and configured in serial and/or parallel structures. The high hydraulic conductivity of the monolithic unit arises from the hierarchy of interconnected pores that results in turbulent flow of liquids as they pass through the monolithic unit in conjunction with the antimicrobial material or antimicrobial components located on pore surfaces.

When the monolithic unit is installed in a housing and mounted in a river, stream, pond, lake, marsh, ocean or other natural or man-made water environment, the apparatus and system may be used to remediate polluted and contaminated natural and man-made water systems.

The monolithic unit may be fabricated using procedures generally described in US Patent Application "Porous Composite Media for Facultative Bacterial Reduction of Contaminates in Wastewater", U.S. Ser. No. 61/508,808 filed Jul. 18, 2011, the entire disclosure of which is, by this reference, hereby incorporated herein. The antimicrobial agents may contain a) metallic silver, copper or zinc or blends or alloys, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors. Fabricating the monolithic units in this way creates the hierarchy of interconnected pores in the structure that can contain antimicrobial materials or antimicrobial components and that produce a high hydraulic conductivity. Furthermore, this processing method does not require a high temperature firing step commonly used to make ceramics, so that the antimicrobial materials or antimicrobial components are not thermally damaged or destroyed. Additionally, since the antimicrobial materials or antimicrobial components are added during formation of the porous ceramic or inorganic polymer bonded product, there is minimal post-processing required which reduces manufacturing costs.

The solid and porous liquid filter media processing can produce a filter media with pore surface area exceeding 5 $m^2$/gram provided as a hierarchy of interconnected pores in the porous ceramic or inorganic polymer bonded material that permits a liquid (e.g., water, water-based materials, organic liquids, etc.) to flow through it with high hydraulic conductivity. Uniquely in this fabrication process, the antimicrobial materials are incorporated into the liquid porous ceramic or inorganic polymer bonded product composition before it solidifies into the solid, porous monolithic unit liquid filter media. The process allows for usable surface areas >30 $m^2$/gram that are 10 to 1000 times higher than other commercially available porous materials, thereby enhancing the amount of antimicrobial materials on pore surfaces available to sanitize pathogen-containing liquids. After curing the porous solid, the antimicrobial material is found to exist upon the surfaces of the interconnected pores to provide antimicrobial functionality to the monolithic unit which kills microbes carried in water flowing through the monolithic unit that is intensely mixed within the porous structure. Due to this sequence of processing steps, there is no need to thermally cure the solid and porous monolithic unit liquid filter media at elevated temperatures to produce an antimicrobial filter material.

The liquid impermeable coating may be fabricated from a polymer coating, a polyurethane coating, an epoxy coating, a PVC coating, a rubber coating, a thermoplastic coating, or a thermoset coating. Thermoplastics include but are not limited to polyethylene (PE), polypropylene (PP), polycarbonate (PC), polystyrene (PS), polyamides (PA), polybutylene terephthalate (PBT), thermoplastic polyurethane (TPU) and polyethylene terephthalate (PET). Thermosets include but are not limited to epoxies, phenolics, cyanate esters, bismaleimides, polyimides, acrylics, silicones, urethanes, polyurethane (PU) and latexes. The coating polymer matrix may be a single polymer, a polymer blend, a co-polymer, or a co-polymer blend. The liquid impermeable coating can be produced using conventional manufacturing equipment for producing polymer products, for example, plastic thermal injection molding equipment, plastics casting, polymer extrusion, polymer blow molding, polymer compression molding and the like. The coating can have a smooth surface or a non-smooth textured surface. The antimicrobial materials added to the liquid impermeable coating may contain antimicrobial agents including a) metallic silver, copper or zinc or blends or alloys, or b) organometallics containing silver, copper or zinc or blends, or c) silver, copper, or zinc stearates or blends or d) silver, copper or zinc salts or blends, or e) silver, copper or zinc oxides or blends, or f) silver, copper or zinc silicates or blends, or g) brass, or h) bronze, or i) semiconductors, or j) p-type semiconductors, or k) n-type semiconductors or l) combinations of p-type semiconductors and n-type semiconductors.

Mechanical construction of the monolithic unit with sealed surfaces or attached gaskets can include, but are not limited to, the following process steps:
1. Automated adhesive bonding on circular elements
2. Automated urethane adhesive bonding on circular elements
3. Automated epoxy adhesive bonding on circular elements
4. Automated silicone adhesive bonding on circular elements
5. Adhesive bonding
6. Urethane adhesive bonding
7. Epoxy adhesive bonding
8. Silicone adhesive bonding
9. Adhesively attached $2^{nd}$ layer of poured urethane
10. Adhesively attached $2^{nd}$ layer rubber grommet
11. Adhesively attached $2^{nd}$ layer plastic grommet
12. Insertion of the monolithic unit into a housing, for example, polymer pipe (PVC, polycarbonate, etc.), metal pipe, glass pipe, or ceramic pipe.

The monolithic unit with a liquid impermeable coating can be inserted into a commercially available filter unit to sanitize and purify water. They can replace all or some of the filter elements used in existing filters to provide an improved antimicrobial filter stage. They can also be used in new water filter designs. Alternatively, cylinders can be filled with granules of the porous monolithic unit liquid filter media or combinations of solid and granular porous monolithic unit filter media and be used together.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:
1. A liquid filter unit comprising:
    wherein the filter unit is a host inorganic polymer bonded matrix having an a filter unit which includes an exterior surface and an interior portion wherein the filter unit is a host inorganic polymer bonded matrix;
    a plurality of pores located within the interior portion of the filter unit;
    an organometallic purification agent having antimicrobial properties embedded within interior portion of the bonded matrix; and
    a coating applied to less than all of the exterior surface of the filter unit wherein the coating is impermeable to liquid and wherein a liquid to be filtered may pass through the filter unit only at the portions of the exterior surface of the filter unit not covered by the impermeable coating.

2. The liquid filter unit of claim 1 wherein the purification agent is an anti-bacterial, an anti-viral, an anti-fungal and/or an anti-mold agent.

3. The liquid filter unit of claim 1 wherein the coating is a polymer coating, a polyurethane coating, an epoxy coating, a PVC coating, a rubber coating, a thermoplastic coating or a thermoset coating.

4. The liquid filter unit of claim 1 further comprising:
    a second purification agent embedded within the liquid impermeable coating wherein the second purification agent includes a metallic silver, a metallic copper, and/or a metallic zinc element.

5. The liquid filter unit of claim 1 further comprising:
a top and a bottom wherein the liquid passes in one direction through the filter unit from the top of the filter unit to the bottom of the filter unit.

6. The liquid filter unit of claim 1 wherein the pores of the filter unit have a surface area that exceeds 5 $m^2$/gram of filter unit.

7. The liquid filter unit of claim 1 wherein the filter unit is made of a ceramic and/or a cementitious material.

8. A liquid filter unit and housing assembly comprising:
a housing unit having an interior surface and exterior surface;
a filter unit wherein the filter unit is a host inorganic polymer bonded matrix and wherein the filter unit comprises:
an exterior surface and an interior portion;
a plurality of pores located within the interior portion of the filter unit;
an organometallic purification agent having antimicrobial properties embedded within interior portion of the bonded matrix; and
wherein the housing unit secures the filter unit in place and wherein the housing unit has an opening which allows a liquid to access the filter unit and pass through the filter unit a coating applied to less than all of the exterior surface of the filter unit wherein the coating is impermeable to liquid and wherein the liquid to be filtered may pass through the filter unit only at the portions of the exterior surface of the filter unit not covered by the coating.

9. The liquid filter unit and housing assembly of claim 8 further comprising:
a coating applied to less than all of the exterior surface of the housing wherein the coating is impermeable to liquid.

10. The liquid filter unit and housing assembly of claim 8 further comprising:
a screen located at a portion of the exterior surface of the housing unit wherein the screen prevents some solid material from exiting the interior of the housing.

11. The liquid filter unit and housing assembly of claim 8 further comprising:
a porous bag located within the interior of the housing wherein the porous bag contains at least one filter unit.

12. The liquid filter unit and housing assembly of claim 8 further comprising:
a gasket attached to the exterior surface of the housing wherein the gasket is secured to a solid surface and prevents the movement of the housing and filter unit.

13. The liquid filter unit and housing assembly of claim 8 the pores of the filter unit have a surface area that exceeds 5 $m^2$/gram of filter unit.

14. The liquid filter unit and housing assembly of claim 8 further comprising:
an adhesive applied to the exterior surface of the housing wherein the adhesive secures the housing to a solid surface.

15. The liquid filter unit and housing assembly of claim 8 wherein the filter unit is made of a ceramic and/or a cementitious material.

* * * * *